Nov. 30, 1965 J. ORTHEIL ETAL 3,220,594
PRESSURE VESSEL
Filed Nov. 29, 1961 2 Sheets-Sheet 1
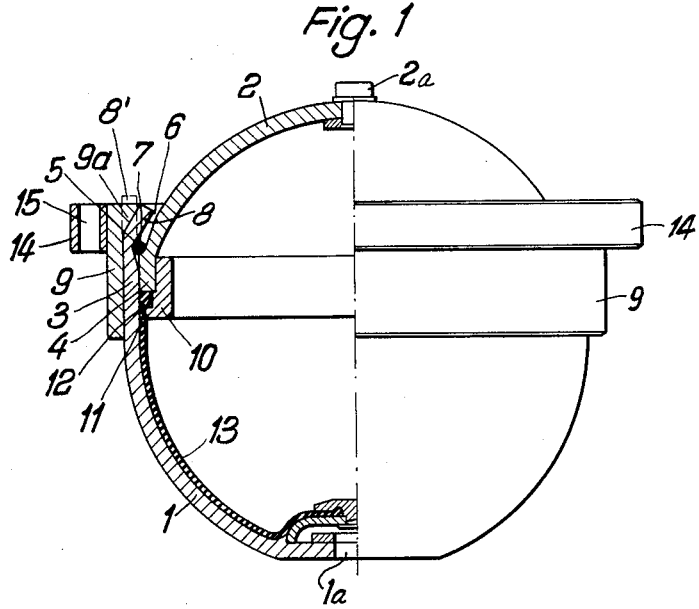
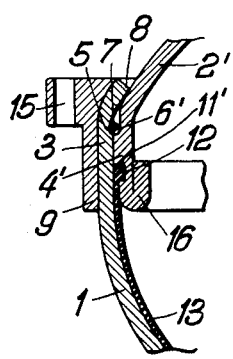
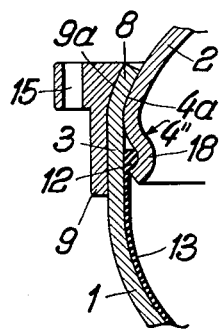
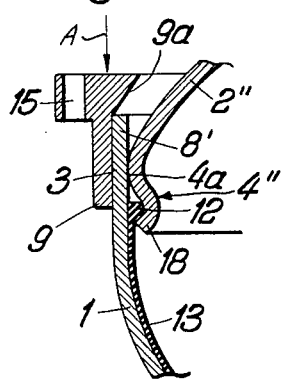
Inventors:
JOHANNES ORTHEIL
WALTER WIELAND
WERNER DÖRING
BY Michael S. Striker
ATTORNEY Nov. 30, 1965   J. ORTHEIL ETAL   3,220,594
PRESSURE VESSEL
Filed Nov. 29, 1961   2 Sheets-Sheet 2

Inventors:
JOHANNES ORTHEIL
WALTER WIELAND
WERNER DÖRING
BY Michael S. Striker
ATTORNEY United States Patent Office 3,220,594
Patented Nov. 30, 1965

1

3,220,594
PRESSURE VESSEL
Johannes Ortheil, Anrath, Walter Wieland, Buderich, Dusseldorf, and Werner Döring, Sprockhovel, Germany, assignors to Langen & Co., Dusseldorf, Germany
Filed Nov. 29, 1961, Ser. No. 155,701
Claims priority, application Germany, Nov. 30, 1960,
L 37,663
1 Claim. (Cl. 220—5)

The present invention relates to pressure vessels or pressure accumulators in general, and more particularly to a substantially spherical fluidtight pressure vessel. Such pressure vessels are utilized for storage of liquid and/or gaseous media, and the arrangement may be such that the liquid medium comes into actual contact with the gaseous medium or that the two media are separated by a deformable partition which is installed in the interior of the vessel so that it permits transmission of pressures from the gaseous medium to the liquid medium or vice versa. As a rule, the pressure of the liquid medium is increased by increasing the pressure of the gaseous medium.

An important object of the invention is to provide a hollow pressure vessel comprising two substantially semispherical shells which are fluidtightly coupled to each other without welding and without requiring a connection in the form of internal or external threads.

Another object of the invention is to provide a pressure vessel of the just outlined characteristics wherein the connection between the two shells can withstand exceptionally high internal pressures without permitting leakage of the entrapped fluid.

A further object of the invention is to provide a very cheap and highly reliable connection between the semispherical shells of a hollow spherical pressure vessel, to provide a fluidtight connection between the internal partition and the shells, and to provide a pressure vessel which may be readily taken apart for inspection, cleaning and/or replacement of the internal partition.

Still another object of the invention is to provide a pressure vessel wherein the rim portions of the two shells need not be deformed to provide a fluidtight and pressure-resistant seal therebetween.

With the above objects in view, the invention resides in the provision of a hollow substantially spherical pressure vessel or pressure accumulator which includes a first and a second substantially semispherical shell each of which comprises an annular rim portion with the rim portion of the second shell snugly received in the rim portion of the first shell. In its preferred form, the outer diameter of the rim portion of the second shell at least approximates the inner diameter of the pressure vessel, and the rim portion of the first shell is at least partly cylindrical with an inner diameter at least approximating the outer diameter of the rim portion of the second shell.

Certain other features of the invention reside in the provision of a specially configured rim portion which forms part of the first shell and which may comprise integral or separate but rigidly secured reinforcing means so that its resistance to internal pressures developing in the pressure vessel exceeds the resistance of the rim portion forming part of the second shell, in the provision of sealing means for preventing communication between the interior of the pressure vessel and the surrounding atmosphere, in the provision of special retaining means which prevents withdrawal of the rim portion of the second shell from the rim portion of the first shell, in such selection of the material of which the shells are made that one of the rim portions readily assumes the curvature of the other rim portion or vice versa when the rim portion of the second shell is introduced into the rim portion of the first shell, and in special construction of reinforcing means

2 for the rim portion of the first shell so that this reinforcing means may deform the outer zone of the rim portion of the first shell into edgewise or face-to-face abutment with the outer side of the second shell.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a partly elevational and partly central sectional view of a hollow spherical pressure vessel embodying one form of the invention;

FIG. 2 is a fragmentary central section through a slightly modified pressure vessel wherein the rim portion of the smaller-diameter shell is provided with an inwardly bent reinforcing annulus;

FIG. 3 is a fragmentary central section through a different pressure vessel in partly assembled position;

FIG. 4 is a similar fragmentary section showing the pressure vessel of FIG. 3 in fully assembled position;

Figure 5:
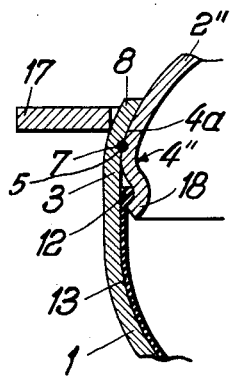
FIG. 5 is a fragmentary central section through a pressure vessel which is identical with that of FIG. 4 excepting that the cylindrical clamping member is replaced by a flat washer which is shrunk onto the rim portion of the larger-diameter shell.

Referring now in greater detail to the drawings, and first to FIG. 1, there is shown a hollow substantially spherical pressure vessel which comprises a smaller-diameter shell 2 of substantially semispherical shape and a larger-diameter shell 1 of similar shape. The mouth of the shell 1 is surrounded by a cylindrical rim portion 3 overlapping (i.e. surrounding) the cylindrical rim portion 4 of the shell 2. The inner diameter of the rim portion 3 at least approximates the outer diameter of the rim portion 4 so that the latter is snugly received in the rim portion of the larger-diameter shell 1. The inner diameter of the rim portion 3 at least approximates the inner diameter of the pressure vessel.

The rim portion 3 is provided with an internal annular groove 5 which is somewhat spaced from its open end, and a similar external groove 6 is formed in or adjacent to the rim portion 4 so that the cooperating grooves 5, 6 may receive a retaining element in the form of a strong and rather rigid split ring 7 made of steel or another metallic material.

FIG. 1 illustrates the pressure vessel in fully assembled position, i.e. with the outer zone 8 of the rim portion 3 bent inwardly against the outer side of the shell 2 so as to form a flange which completely encloses the ring 7 and constitutes a second retaining means for the shell 2. In its original undeformed position 8', the annular flange 8 is coaxial with the main part of the rim portion 3 and is thereupon deformed by the conical internal surface 9a of a substantially cylindrical clamping member 9 which surrounds and is rigid with the rim portion 3 and is provided with attaching means in the form of an external collar 14 serving to secure the pressure vessel to a supporting plate or the like (not shown). The means for connecting the clamping member 9 to its support may assume the form of bolts passing through axially parallel bores 15 provided in the collar 14. Once the clamping member is forced onto the rim portion 3, its conical internal surface 9a deforms the flange 8 into the full-line position of FIG. 1 and thereby securely connects the rim portions 3, 4 to each other. In addition, the clamping member 9 reinforces the rim portion 3 of the larger-diameter shell 1 so that this rim portion can safely withstand internal pressures developing in the vessel and is stronger than the rim portion 4 of the smaller-diameter shell 2. In other words, the clamping ring performs the additional function of reinforcing the mouth of the larger-diameter shell 1.

The mouth of the smaller-diameter shell 2 is reinforced by an annular member in the form of a short cylinder 10 which is forced into the rim portion 4 so that it partially extends beyond the end zone of this rim portion. This cylinder prevents the rim portions 3, 4 from buckling when the clamping member 9 is applied over and deforms the flange 8. For example, the cylinder 10 may be press-fitted into the shell 2 prior to insertion of the rim portion 4 into the portion 3 or it may be welded or otherwise rigidly secured to the rim portion 4. That portion of the cylinder 10 which extends beyond the rim portion 4 is formed with an external annular groove 11 for the enlarged marginal portion 12 of a deformable partition or diaphragm 13 which serves as a means for separating a liquid medium introduced through the port 2a of the shell 2 from a gaseous fluid admitted through the port 1a of the shell 1. If the pressure vessel of FIG. 1 operates without a deformable partition, the external groove 11 of the cylinder 10 may receive a suitable packing (not shown). Such packing or the marginal reinforcing zone 12 of the partition 13 completely seals the joint between the shells 1, 2 from the surrounding atmosphere. It will be noted that the groove 11 is overlapped by the rim portion 3.

As is known, a spherical pressure vessel permits the greatest volume for a given enveloping surface and is uniformly stressed in all directions to allow for most economical utilization of material.

FIG. 2 illustrates a modified pressure vessel wherein the construction of the larger-diameter shell 1 and of the clamping member 9 is identical with that of the corresponding parts in FIG. 1. However, the smaller-diameter shell 2' is formed with a comparatively short cylindrical rim portion 4' whose outer zone is bent inwardly to form an annular reinforcing element 16 corresponding to the cylinder 10 of FIG. 1. The rim portion 4' is formed with an external annular groove 11' for the marginal portion or packing 12 of the partitioning diaphragm 13. The internal groove 5 of the rim portion 3 cooperates with the adjacent external groove 6' of the rim portion 4' to receive a retaining ring 7. It will be noted that the grooves 6' and 11' are overlapped by the rim portion 3. As explained hereinabove, the partition 13 may be omitted and its marginal portion 12 replaced by an annular packing to provide a fluidtight seal between the interior of the vessel and the surrounding atmosphere.

Referring to FIG. 3, there is shown a partly assembled pressure vessel comprising a larger-diameter shell 1 which is identical with the shells 1 of FIGS. 1 and 2 excepting that its cylindrical rim portion 3 is without an internal groove such as the groove 5 of FIG. 1. The smaller-diameter shell 2″ comprises a circumferentially corrugated rim portion 4″ providing an annular ridge 4a and an adjacent external groove 18 which latter receives the marginal portion 12 of the diaphragm 13. The ridge 4a abuts against the inner side of the rim portion 3 along a line located inwardly of the latter's still undeformed end zone 8'. In FIG. 3, the clamping member 9 is shown in a position which it assumes before its internal surface 9a deforms the zone 8' into the form of a flange 8 as shown in FIG. 4. The clamping member 9 is then forced over the rim portion 3 (see the arrow A in FIG. 3) and moves the flange 8 into sealing abutment with the outer side of the overlapped shell 2″. The curvature of the internal face 9a is preferably such that the clamping member 9 may deform the flange 8 into full face-to-face sealing abutment with the shell 2″ so that the split ring 7 may be dispensed with, i.e. the flange 8 then constitutes the sole means for retaining the rim portion 4″ in the rim portion 3. The marginal portion 12 of the partition 13 is inserted into the groove 18 before the rim portion 4″ is inserted into the overlapping rim portion 3.

FIG. 5 illustrates a different pressure vessel whose semispherical shells 1, 2″ are identical with those shown in FIGS. 3 and 4 but are connected with each other by means of a different clamping member 17 which assumes the form of a flat washer and whose inner diameter normally is less than the outer diameter of the rim portion 3 in the latter's undeformed condition. In order to apply it onto the rim portion 3, the clamping member 17 is heated so that its internal diameter increases to equal the outer diameter of the rim portion 3. When it is allowed to cool, the clamping member 17 shrinks and deforms the outer zone of the rim portion 3 so that this outer zone again assumes the form of an inwardly bent flange 8 and sealingly engages the outer side of the overlapped shell 2″. In this embodiment, the rim portion 3 is formed with an internal groove 5 which cooperates with an external groove of the rim portion 4' to receive a split ring 7 which latter constitutes additional means for retaining the rim portion 4' in the rim portion 3. The marginal portion 12 of the partitioning diaphragm 13 is retained in the groove or recess 18 in the same manner as described in connection with FIGS. 3 and 4.

Figure 6:
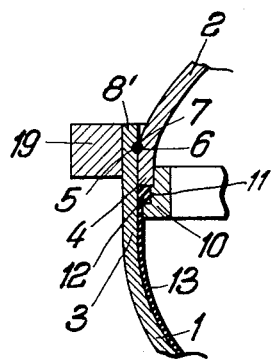
FIG. 6 is a fragmentary central section through a fully assembled pressure vessel comprising a larger-diameter shell whose rim portion is not deformed by the clamping member.

In the embodiment of FIG. 6, the pressure vessel comprises a pair of shells 1, 2 which are identical with those shown in FIG. 1 and which are connected to each other without necessitating any deformation or their respective rim portions 3 and 4. The split ring 7 constitutes the sole retaining means for the shell 2 because the clamping member 19 is formed with a cylindrical bore which is press-fitted onto or is otherwise rigidly secured to the rim portion 3. In other words, the outer zone 8' of this rim portion is not deformed into abutment with the ouer side of the shell 2. The clamping member 19 serves the purpose of preventing deformation of the shell 1 in response to internal pressures developing in the assembled pressure vessel and to reinforce the rim portion 3 during insertion of the rim portion 4 and split ring 7.

The rim portion 4 is reinforced by the cylinder 10 in the same way as explained in connection with FIG. 1, and this cylinder is again provided with an external annular groove 11 for the marginal portion 12 of the diaphragm 13. The marginal portion 12 constitutes a packing which seals the interior of the pressure vessel from the atmosphere.

In assembling the pressure vessel of FIG. 6, the rim portion 4 is introduced into the rim portion 3 to such an extent that the gap between the outer side of the shell 2 and the inner side of the outer zone 8' is sufficient to permit insertion of the split ring 7 into the internal groove 5 of the rim portion 3. In the next step, the cylindrical rim portion 4 is withdrawn to the position of FIG. 6 so that the ring 7 snaps into the groove 6 and thereby locks the shells 1, 2 against any displacement with respect to each other. In order to separate the shells 1, 2, the procedure is reversed, i.e. the rim portion 4 is pushed downwardly, as viewed in FIG. 6, so that the ring 7 may be removed from the groove 5, and the shell 2 is then free to move upwardly so as to withdraw the rim portion 4 from the rim portion 3.

Figure 7:
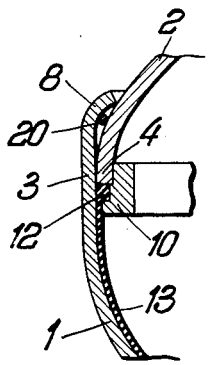
FIG. 7 is a similar fragmentary central section through a fully assembled pressure vessel including a larger-diameter shell with a rim portion which is formed with integral reinforcing means.

FIG. 7 illustrates a further embodiment of the invention according to which the pressure vessel comprises two semispherical shells 1, 2 of the type shown in FIGS. 1 and 6, but wherein the overlapping rim portion 3 is not surrounded by a clamping member. The construction of the overlapped rim portion 4 and of the reinforcing or stiffening cylinder 10 is the same as described in connection with FIG. 1. The flange 8 is not in face-to-face but only in edgewise abutment with the outer side of the shell 2 and is deformed in such a way as to form with the shell 2 an annular compartment for the retaining ring 7 which latter need not be split since it can be readily introduced into the gap between the outer side of the shell 2 and the inner side of the outer zone 8' (not shown in FIG. 7) before the latter is deformed into the shape of the flange 8. The flange 8 reinforces the rim portion 3 to such an extent that, at least in certain instances, the clamping member may be dispensed with.

In all embodiments of the invention, the pressure vessel preferably comprises shells of such thickness that at least one thereof may be deformed to conform the configuration of the rim portion on the overlapping shell to the configuration of the rim portion on the overlapped shell or vice versa when the two shells are connected with each other, i.e. when the smaller-diameter rim portion is introduced into the other rim portion.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

A hollow substantially spherical pressure vessel comprising, in combination, a first substantially semispherical shell having an annular rim portion; a second substantially semispherical shell having a cylindrical rim portion with an inner diameter equal to the inner diameter of said vessel and to the outer diameter of said annular rim portion and said annular rim portion snugly received in said cylindrical rim portion, said cylindrical rim portion having an inwardly bent annular flange at the outer end thereof, said flange in face to face abutment with the outer side of said first shell; a retaining ring received in cooperating internal and external annular grooves respectively provided in said cylindrical rim portion and said first shell; and an annular clamping member rigid with and surrounding said cylindrical rim portion for reinforcing the same so that said cylindrical rim portion is more resistant to internal pressures developing in said vessel than said annular rim portion.

References Cited by the Examiner
UNITED STATES PATENTS

| | | | |
|---|---|---|---|
| 2,339,076 | 1/1944 | Huber | 138—30 |
| 2,645,513 | 7/1953 | Sterrett. | |

FOREIGN PATENTS 802,702  10/1958  Great Britain.

THERON E. CONDON, *Primary Examiner.*

EARLE J. DRUMMOND, GEORGE O. RALSTON,
*Examiners.*